United States Patent [19]
Kluth et al.

[11] Patent Number: 5,991,026
[45] Date of Patent: Nov. 23, 1999

[54] APPARATUS FOR MULTIPLEXING FIBRE-OPTIC SENSING INTERFEROMETERS

[75] Inventors: Erhard Lothar Edgar Kluth; Malcolm Paul Varnham, both of Hampshire, United Kingdom

[73] Assignee: Sensor Dynamics Limited, Winchester, United Kingdom

[21] Appl. No.: 08/813,651

[22] Filed: Mar. 7, 1997

[30] Foreign Application Priority Data

Mar. 11, 1996 [GB] United Kingdom .................... 9605144

[51] Int. Cl.⁶ .................................................. G01B 9/02
[52] U.S. Cl. ..................................... 356/345; 250/227.27
[58] Field of Search ............................. 356/35.5, 34.5; 250/227.19, 227.27; 385/12, 14

[56] References Cited

U.S. PATENT DOCUMENTS

| | | | |
|---|---|---|---|
| 4,848,906 | 7/1989 | Layton | 356/345 |
| 5,173,743 | 12/1992 | Kim | 356/345 |
| 5,680,489 | 10/1997 | Kersey | 356/35.5 |

FOREIGN PATENT DOCUMENTS 2284256  1/1995  United Kingdom .

OTHER PUBLICATIONS

Spatially–multiplexed fiber optic Bragg grating strain and temperature sensor system based on interferometric wavelength–shift detection, Rao et al, Electronics Letters, pp. 1009–1010, Jun. 1995.

*Primary Examiner*—Samuel A. Turner
*Attorney, Agent, or Firm*—Iandiorio & Teska

[57] ABSTRACT

Apparatus for multiplexing fiber-optic sensing interferometers, which apparatus comprises at least one optical source, a plurality of matched interferometers connected to the optical source and each containing a phase modulator having a unique identifying characteristic, a network of fiber-optic sensing interferometers each containing a path-length difference, at least one detector, and interconnections provided between the matched interferometers, the network of fiber-optic sensing interferometers and the detector, the path length difference in each fiber-optic sensing interferometer being approximately matched to a path length difference in its associated matched interferometer, and the interconnection means between the matched interferometers, the network of fiber-optic sensing interferometers and the detector being such that there is no more than one signal on the detector having the same unique identifying characteristic associated with one of the phase modulators.

17 Claims, 8 Drawing Sheets

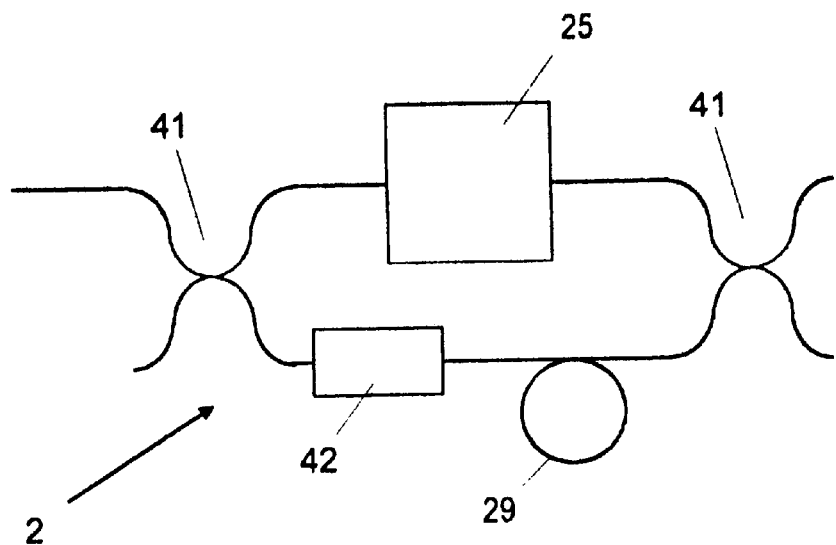
FIG 3
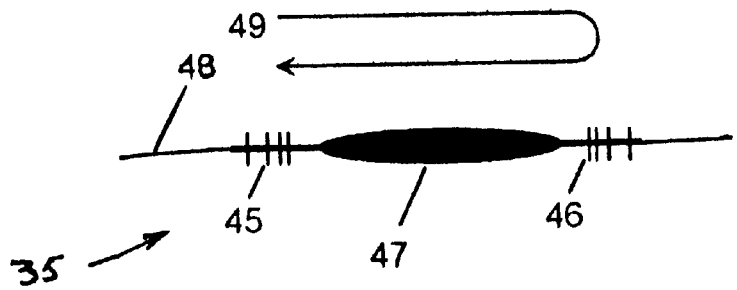
FIG 4
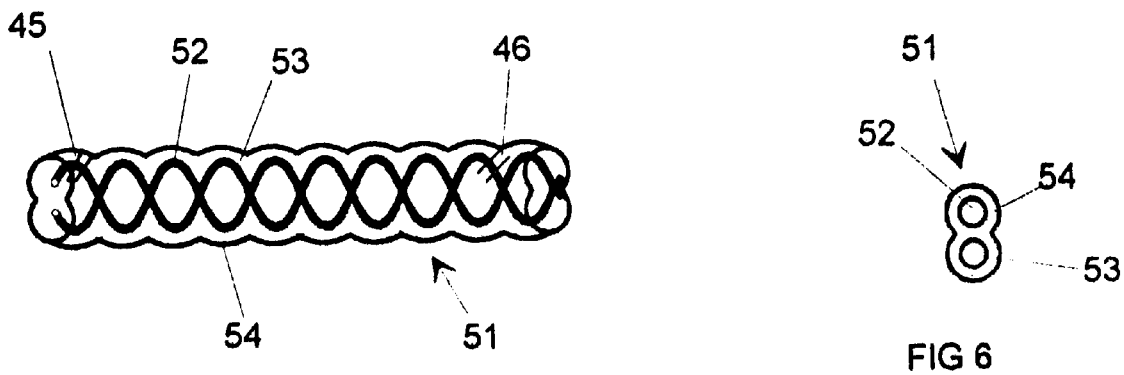
FIG 5
FIG 6

APPARATUS FOR MULTIPLEXING FIBRE-OPTIC SENSING INTERFEROMETERS

This invention relates to apparatus for multiplexing fibre-optic sensing interferometers. The invention is especially suited to the simultaneous interrogation of a large number of hydrophones.

There is a demand in the oil and gas industry to improve the hit rate of locating recoverable reserves, and for increasing the percentage of oil and gas recovered from reservoirs. This has resulted in the demand for improvements in the quality of seismic surveys and in a demand for in-reservoir fluid-imaging techniques. Both these requirements demand large numbers of sensors networked together.

Similar requirements in defence applications have been met using time-division multiplexing techniques, involving interrogating a number of hydrophone elements using a single pulse of light. The technique relies on the fact that each hydrophone along the path part of the pulse energy will be modified by the hydrophone and reflected. This results in a series of reflected light pulses returning to a detector at different times from the separate hydrophone elements. The problem with this approach is that bandwidth is limited because of aliasing effects, which also restricts dynamic range. A further problem is that the number of elements addressable by a single source is relatively limited, leading to a fairly large number of expensive electro-optic sources required in the total system.

A particular demand is for large arrays of optical hydrophones which can be interrogated simultaneously over single fibre leads, in real-time, with high-dynamic range, and relatively wide bandwidth response. Such hydrophones are attractive for pumping through narrowbore conduits into oil reservoirs. Conventional coiled hydrophones are unsuited for this application because their diameter is not small enough. The hydrophone needs to have a diameter of no more than around 2 mm. The implication here is that the length of fibre which can be used in each hydrophone can be no longer than around 1 m to 10 m, which is significantly shorter than the 30 m to 300 m used in conventional optical fibre hydrophone systems which are coiled. These short lengths pose significant problems for the time-division multiplexing systems currently employed. In particular, the bandwidth of the resulting system is restricted owing to aliasing effects, and the pulse length (which when coherent light from a laser is used, conventionally corresponds to around the length of each coil) becomes excessively short making the electronic instrumentation difficult to implement.

Arrays exceeding 10,000 hydrophone elements can be envisaged in thin arrays which are extremely attractive for seismic streamers. These hydrophone elements would also need to be relatively short (around 1 m to 10 m).

Apparatus suitable for the simultaneous acquisition of high-bandwidth information in very-long arrays is disclosed in GB2284256A and its equivalent U.S. Pat. No. 5,754,293. Wavelength division multiplexing was used in this apparatus such that hydrophone arrays could be interrogated with broadband light, and the information from each hydrophone returned at unique wavelengths. These wavelengths were separated and routed to different detectors. This apparatus has the drawback in that it utilises a very-large number of detectors—one per hydrophone element. Nevertheless, it is probably the only way to achieve very-high bandwidth (500 kHz) interrogation of very-short (1 m) hydrophones. The apparatus is probably not cost-effective for very-large hydrophone arrays where the bandwidth requirement is relatively modest (100 Hz to 6 kHz).

An aim of the present invention is to allow the measurement of one or more parameters using an apparatus which is expandable to a large number of sensing elements utilising efficient multiplexing and demultiplexing techniques. A further aim is to reduce the power dissipation in the instrument.

Accordingly, the present invention provides apparatus for multiplexing fibre-optic sensing interferometers, which apparatus comprises at least one optical source, a plurality of matched interferometer means connected to the optical source and each containing a phase modulator having a unique identifying characteristic, a network of fibre-optic sensing interferometers each containing a path-length difference, at least one detector, and interconnection means provided between the matched interferometer means, the network of fibre-optic sensing interferometers and the detector, the path length difference in each fibre-optic sensing interferometer being approximately matched to a path length difference in its associated matched interferometer means, and the interconnection means between the matched interferometer means, the network of fibre-optic sensing interferometers and the detector being such that there is no more than one signal on the detector having the same unique identifying characteristic associated with one of the phase modulators.

The apparatus of the invention is such that the unique identifying characteristic of each phase modulator is different from all other unique identifying characteristics of all the phase modulators in the plurality of matched interferometer means.

At least one of the phase modulators may be a frequency shifter whose unique identifying characteristic is the magnitude of the frequency shift.

It is desirable that the apparatus is such that the path length difference in each fibre-optic sensing interferometer is greater than the coherence length of the source means.

The fibre-optic sensing interferometers may be interferometric sensing elements constructed mainly from optical fibre.

The apparatus of the invention may be one in which at least one of the said fibre-optic sensing interferometers is formed in a length of optical fibre having two ends, and in which each said end is provided with an optical fibre Bragg grating. The optical fibre Bragg grating in at least one of the said fibre-optic sensing interferometers may be chirped in opposite directions.

Preferably, the fibre-optic sensing interferometers are optical fibre hydrophones. The optical fibre hydrophones may be constructed from an optical fibre twisted around a compliant member and bonded.

The apparatus of the invention may be one in which there is a plurality of the optical sources, in which the optical sources have centre wavelengths, in which each said optical source is connected to a said matched interferometer means, in which each said matched interferometer means contains a frequency shifter with a unique frequency, in which each said matched interferometer means is connected to first coupler means which couples power from said matched interferometer means to arrays of the fibre-optic sensing interferometers, in which each fibre optic sensing interferometer comprises an input optical fibre Bragg grating and an output optical fibre Bragg grating, in which no two of the fibre-optic sensing interferometers in each array of the fibre-optic sensing interferometers have the same centre reflective wavelength, in which the path length difference in each fibre-optic sensing interferometer is approximately equal to the path length difference in its associated matched interferometer means, in which there is a plurality of the detectors, and in which there is a plurality of the second coupler means for directing the reflected power from each array of the fibre optic sensing interferometers each to a separate one of the detectors.

The apparatus of the invention may be one in which each said detector is connected to a low-noise amplifier, and in which there is an array of demodulators each comprising a tuned filter tuned to a unique frequency, whose output is connected to two phase-modulation demodulators whose references are signals at the said unique frequency, but whose phases are in quadrature, and in which the outputs from the phase-modulation demodulators are processed in processing to give an instantaneous output signal comprising integral and fractional fringe positions.

The apparatus of the invention may be one in which there is a plurality of the optical sources connected to the plurality of the matched interferometer means, in which each said matched interferometer means is connected to a separate array of the fibre-optic sensing interferometers, in which each said array of fibre-optic sensing interfometers each contains a plurality of interferometric sensing interferometers, and in which outputs from the fibre-optic sensing interferometers are routed by the interconnection means to a plurality of the detectors such that there is no more than one signal on each detector having the same unique identifying characteristic associated with one of the phase modulators.

The apparatus may be one in which the optical source is a broadband optical source, and in which the path length differences in each of the matched interferometer means are different from each other.

The detector means may utilise the tri-state masking technique reported by Frigo et al. (N. Frigo, A. Dandridge and A. B. Tveten, Electronics Letters, 20, 319, 1984) in order to reduce polarisation-induced fading problems The matched interferometer means may include polarisation controllers in order to reduce polarisation-induced fading problems.

The apparatus may utilise polarisation-maintaining fibre in order to stabilise the state of polarisation.

The apparatus of the invention may comprise p optical sources having central wavelengths $\lambda_1, \lambda_2, \ldots, \lambda_p$ each connected to a matched interferometer means each containing a frequency shifter with a unique frequency $f_1, f_2, \ldots, f_p$, and where each matched interferometer means is connected to a coupler means which couples power from each matched interferometer means to q arrays of fibre-optic sensing elements, each comprising an input optical fibre Bragg grating and an output optical fibre Bragg grating, and where no two fibre-optic sensing interferometers in each single array of fibre-optic sensing interferometers have the same centre reflective wavelength $\lambda_i$, and where the path length difference in each fibre-optic sensing interferometer is approximately equal to the path length difference in its associated matched interferometer means, and where there is a plurality of coupler means to direct the reflected power from each array to a plurality of detector means.

The optical source may be constructed from a single broadband source followed by couplers and optical filters in order to select the desired central wavelengths $\lambda_1, \lambda_2, \ldots, \lambda_p$.

The optical source may be an optical-fibre source such as a superfluorescent optical fibre source which may be followed by at least one optical amplifier. The optical amplifier may be placed anywhere between the optical source and the detector means, but is preferably placed either before or after the coupler means such that the electromagnetic radiation is amplified before entering the arrays of fibre-optic sensing interferometers.

The detector means may comprise a detector, a low-noise amplifier, and an array of demodulators each comprising a tuned filter tuned to a unique frequency $f_i$, whose output is connected to two phase-modulation demodulators whose references are signals at the frequency $f_i$, but whose phases are not equal, and where the outputs from the phase-modulation demodulators are processed in processing means to give an instantaneous output signal comprising integral and fractional fringe positions.

The reference signals for the two phase-modulation demodulators are preferably in quadrature.

Alternatively, the phase-modulation demodulation may be based on conventional phase demodulation techniques such as phase-locked loops.

The apparatus of the invention may comprise a plurality of optical sources connected to a plurality of matched interferometer means each containing a phase modulation means with a unique identifying characteristic and where each matched interferometer means is connected to an array of fibre-optic sensing interferometers each containing a plurality of interferometric sensing elements, and where the outputs from the interferometric sensing element is routed by a plurality of interconnection means to a plurality of detector means such that there is no more than one signal on each detector means having the same unique identifying characteristic associated with one of the phase modulation means.

By way of example, the invention is now described with reference to the accompanying drawings in which:

FIG. 3 shows a matched interferometer;

FIG. 4 shows a hydrophone element containing Bragg gratings;

FIG. 5 shows an essentially linear optical-fibre hydrophone;

FIG. 6 shows the cross-section of the optical-fibre hydrophone of FIG. 5;

Figure 1:
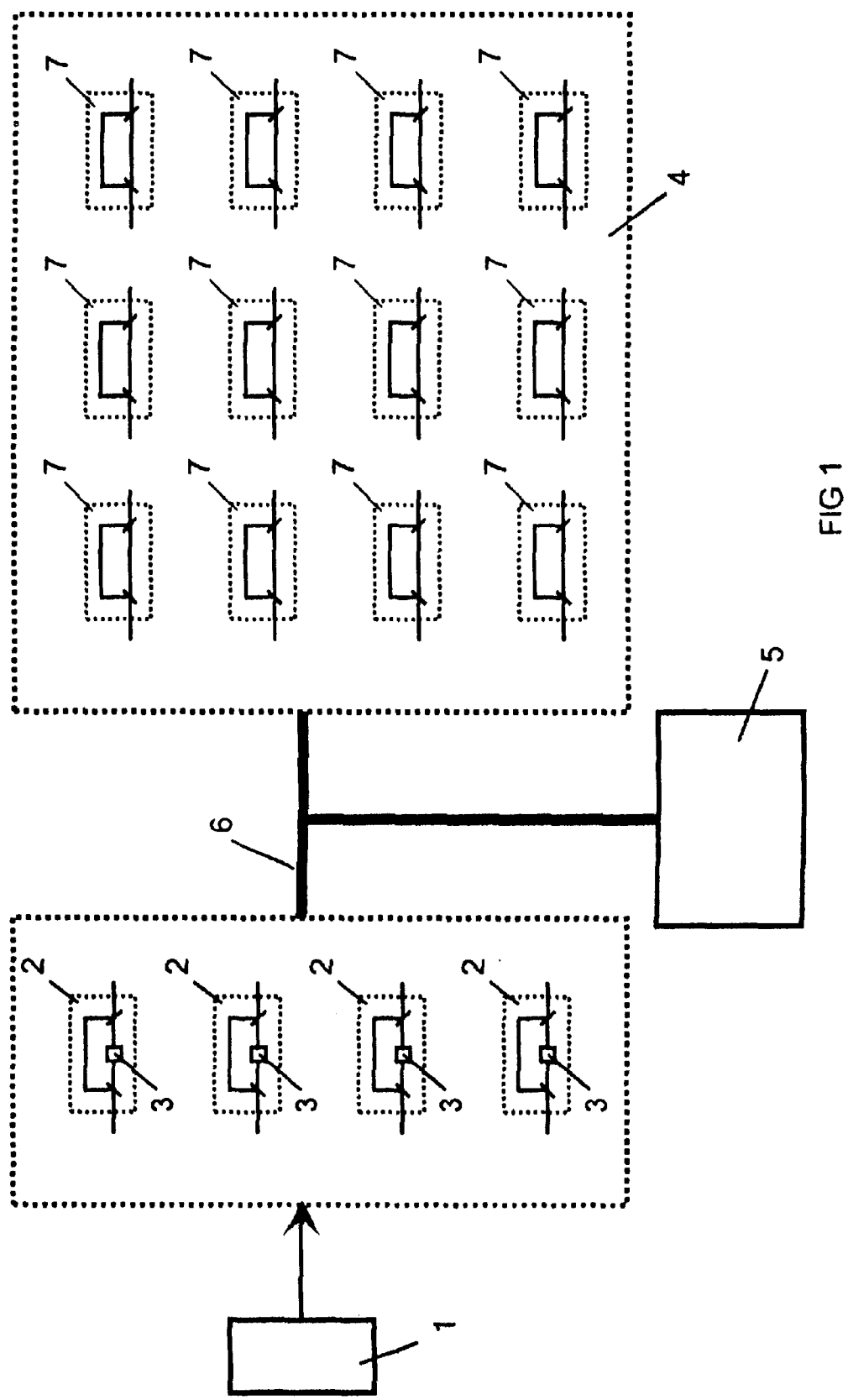
FIG. 1 shows apparatus for sensing one or more parameters comprising an optical source, a plurality of matched interferometer means, a network of fibre-optic sensing interferometers, and a detector means.

With reference to FIG. 1, there is provided apparatus for sensing one or more parameters comprising an optical source 1, a plurality of matched interferometer means 2 each containing a phase modulator means 3 having a unique identifying characteristic, a network of fibre-optic sensing interferometers 4, a detector means 5 and an interconnection means 6, where the path-length difference in each fibre-optic sensing interferometer 7 is approximately matched to the path length difference in its associated matched interferometer means 3, and where the interconnection means 6 between the matched interferometer means 2, the network of fibre-optic sensing interferometers 7 and the detector means 5 is such that there is no more than one signal on the detector means 6 having the same unique identifying characteristic associated with one of the phase modulator means 3.

The optical source 1 may be a laser or preferably a broadband optical source such as a light-emitting diode or a fibre-optic superluminescent source. If a laser is used, then it is important to ensure that either its coherence length is shorter than the path length difference in the matched interferometer means 3 or that the laser is pulsed. This is in order to ensure that unwanted constructive interference does not occur in the detector means 5.

The matched interferometer means 2 may comprise Mach Zehnder or Michelson interferometers with a path length difference between the two arms.

The phase modulator means 3 may be a frequency shifter whose unique identifying characteristic may be the magnitude of the frequency shift which may be varied in time. Suitable frequency shifters include acousto-optical modulators and optical fibre frequency shifters. The phase modulations means 3 may also be a phase modulator constructed using integrated optics or by winding optical fibre around a piezoelectric cylinder and the unique identifying characteristic may be the amplitude and frequency at which the phase is modulated.

The network of fibre-optic sensing interferometers 4 preferably comprises arrays of optical fibre sensor elements 7 joined together with optical fibre which may be interferometers or polarimeters (i.e. polarimetric interferometers).

The fibre-optic sensing interferometers 7 may be optical fibre hydrophones, magnetic field sensors, electric field sensors or pressure sensors.

The detector means 5 may comprise one or more detectors and a low-noise amplifier.

The interconnection means 6 may comprise optical fibres and optical fibre couplers. The interconnection means 6 may also contain planar waveguide couplers such as Lithium Niobate or glass.

Figure 2:
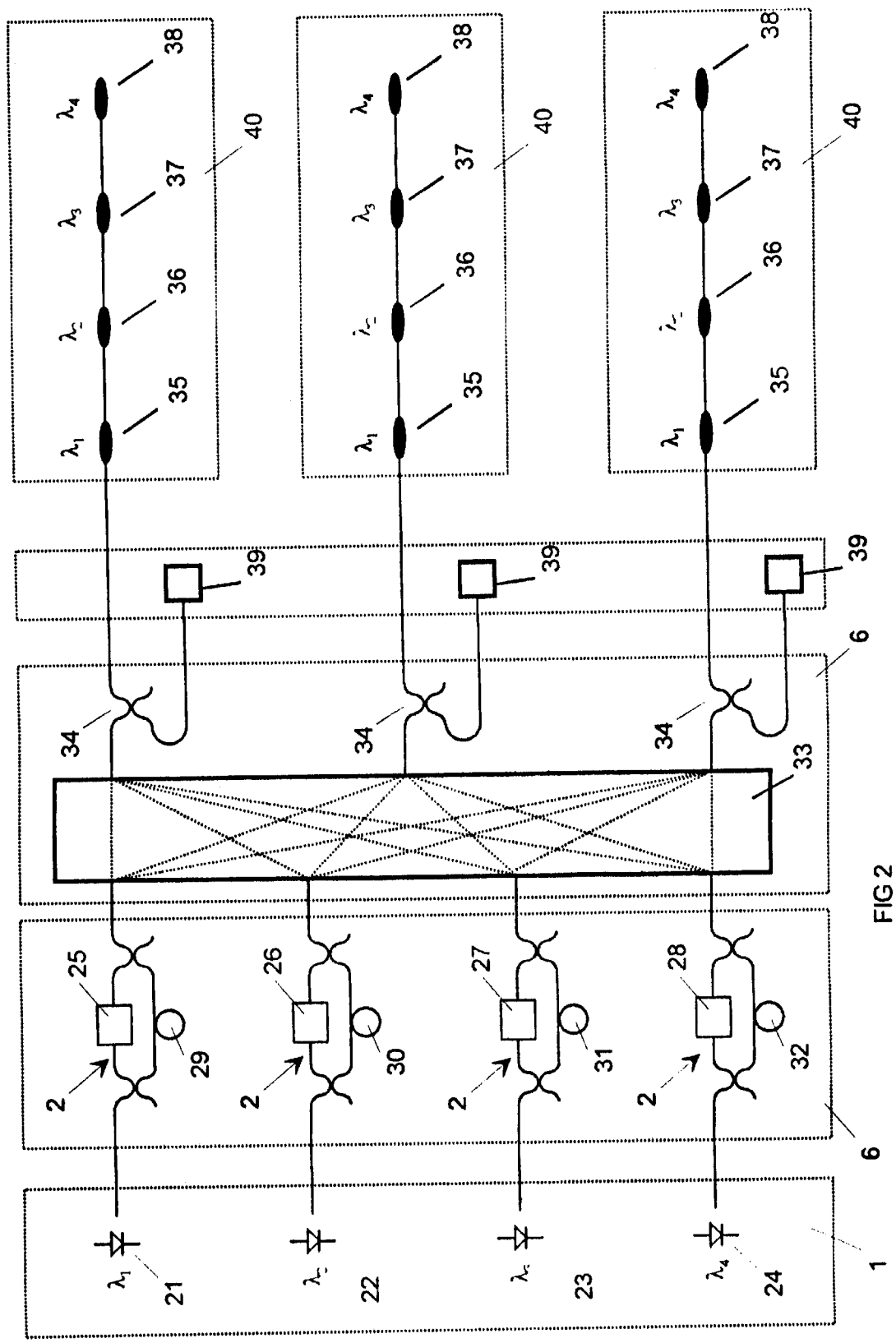
FIG. 2 shows an apparatus for sensing one or more parameters containing four optical sources.

FIG. 2 shows a preferred embodiment of the current invention. There is provided apparatus for sensing one or more parameters comprising four optical sources 21–24 having central wavelengths $\lambda_1, \lambda_2, \lambda_3, \lambda_4$, each connected to a matched interferometer means 2 each containing a frequency shifter 25–28 with a unique frequency $f_1, f_2, f_3, f_4$ and where each matched interferometer means 2 is connected to a coupler means 33 which couples power from each matched interferometer means 2 to three arrays 40 of fibre-optic sensing elements 35–38, each comprising (as shown in FIG. 4) an input optical fibre Bragg grating 45 and an output optical fibre Bragg grating 46, and where no two fibre-optic sensing elements 35–38 in each single array 40 of fibre optic sensing elements 35–38 have the same centre reflective wavelength $\lambda_i$, and where the path length difference 49 (see FIG. 4) in each fibre-optic sensing element 35–38 is approximately equal to the path length difference 29–32 in its associated matched interferometer means 2, and where there is a plurality of coupler means 34 to direct the reflected power from each array 40 to a plurality of detector means 39.

The matched interferometer means 2 is shown in more detail in FIG. 3 and comprises two optical fibre couplers 41 for splitting the input light into two paths and then interfering the light and a frequency shifter 25. Preferably, the matched interferometer means 2 will contain a polarisation controller 42 in one of its arms. The path length difference 29 of the two arms is achieved by including more fibre in the longer arm of the matched interferometer means 2.

FIG. 4 shows a fibre optic sensing element 35 constructed from optical fibre 48, an input optical fibre Bragg grating 45 and an output optical fibre Bragg grating 46. The fibre optic sensing element 35 may be a hydrophone with an additional coating 47 in order to increase the hydrophone's sensitivity to acoustic energy. The input optical fibre Bragg grating 45 and the output optical fibre Bragg grating 46 may be chirped in opposite directions (as shown) in order to increase the hydrophone's sensitivity to acoustic energy.

FIG. 5 shows a preferred embodiment for a hydrophone 51 which is shown in cross-section in FIG. 6. The hydrophone 51 comprises an optical fibre 52 twisted around a compliant member 53 which is preferably made from a coated silica capillary. The entire assembly is coated with a high-temperature polymer 54 such as a high-temperature acrylate. The optical fibre 45 has an input Bragg grating 45 and an output Bragg grating 46 written into it. The advantage of this embodiment is that it is a linear hydrophone which can form the basis of either thin seismic streamers for the exploration of oil and gas reserves, or the basis of a thin acoustic array which can be pumped by fluid drag into oil wells through narrowbore conduits such as hydraulic tubing or coiled tubing. The thin acoustic array can also be pumped through conduits placed in channels drilled into the reservoir or surrounding geological formations in order to assist in seismic surveys, or to monitor the progress of fluid fronts within the reservoir.

Figure 7:
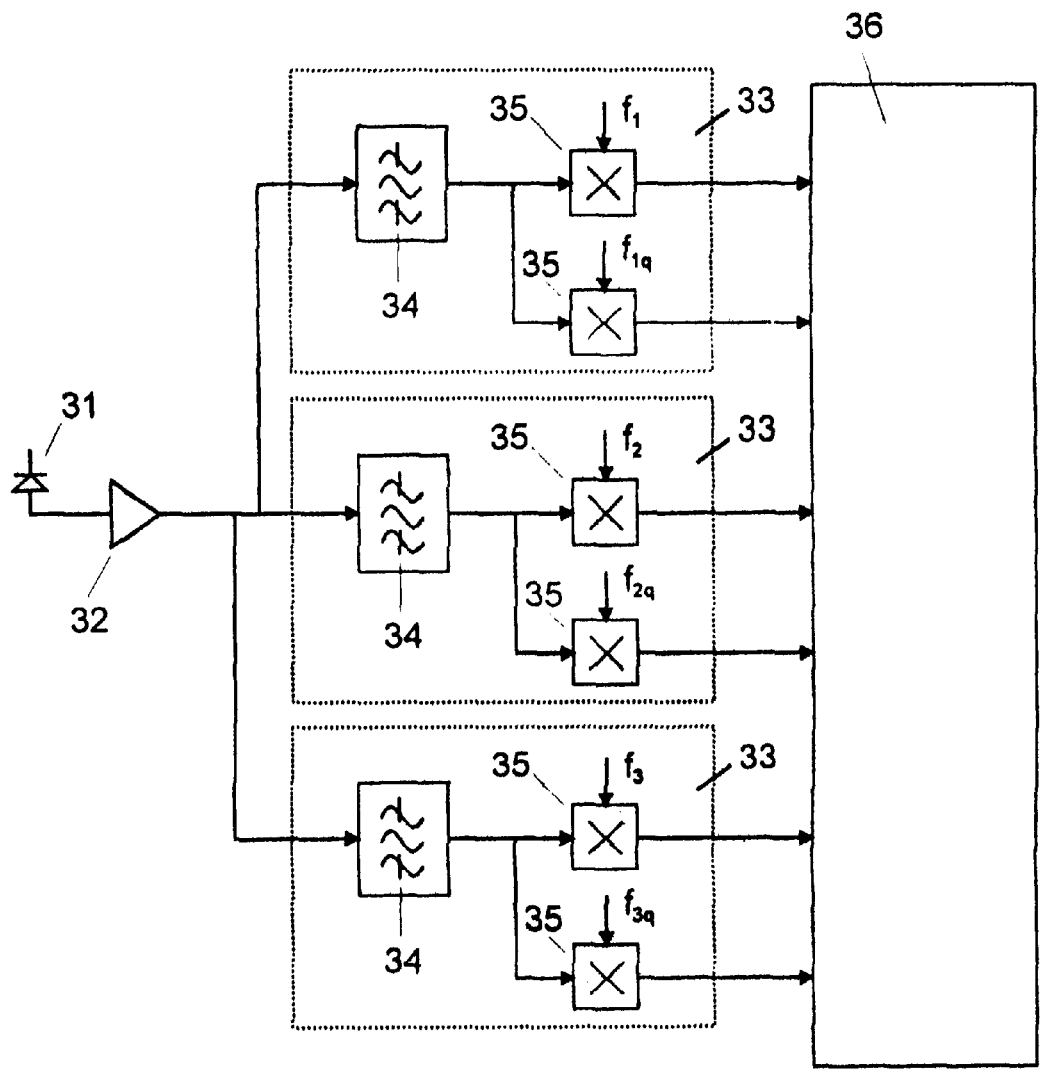
FIG. 7 shows a detector means containing demodulators.

FIG. 7 shows a preferred implementation of the detector means 5 which comprises a detector 31, a low-noise amplifier 32, and an array of demodulators 33 each comprising a tuned filter 34 tuned to a unique frequency $f_i$, whose output is connected to two phase-modulation demodulators 35 whose references are signals at the frequency $f_i$, but whose phases are in quadrature, and where the outputs from the phase-modulation demodulators 35 are processed in processing means 36 to give an instantaneous output signal comprising integral and fractional fringe positions. The latter is possible, because the outputs from the phase-modulation demodulators 35 will be related to $\sin(\theta)$ and $\cos(\theta)$, and these outputs can be combined to remove $2\pi$ ambiguities. This is an important feature for hydrophone arrays where very-high dynamic range is often a requirement. This is achieved with conventional piezoelectric hydrophones with 24 bit digital to analogue converters. However, the system described here would be able to relax the requirement from the analogue to digital converter since the integral number of fringes moved in the interferometer is inherently a digital entity. It will be appreciated that the tuned filters 34 are not strictly required, and that the phase modulation demodulators 35 may include low-pass filters on their outputs.

Referring to the embodiments illustrated in FIGS. 2 to 7, the overall system has the following advantages. The individual fibre-optic sensing elements 7 can each be interrogated simultaneously with high dynamic range and bandwidth—ie without the usual constraints imposed by time-division multiplexing systems. Moreover, if the optical sources 1 use broadband light, then the embodiment facilitates the interrogation of short (1 m to 10 m) optical fibre hydrophones because the sources can be operated continually without the need to generate ultra-short pulses. It should be noted here that care has to be taken to avoid cross-talk between hydrophones in this instance. This can be achieved by ensuring the spectra from the optical sources 21–24 do not overlap, and/or by ensuring that the path length differences 29–32 are greater than the coherence lengths of the optical sources 21–24.

The embodiment represents an extremely efficient utilisation of optical sources 1 and detector means 5. The number of fibre-optic sensing interferometers 7 that it is possible to interrogate simultaneously is given by the product of the number of optical sources 1 and the number of detector means 5.

Figure 8:
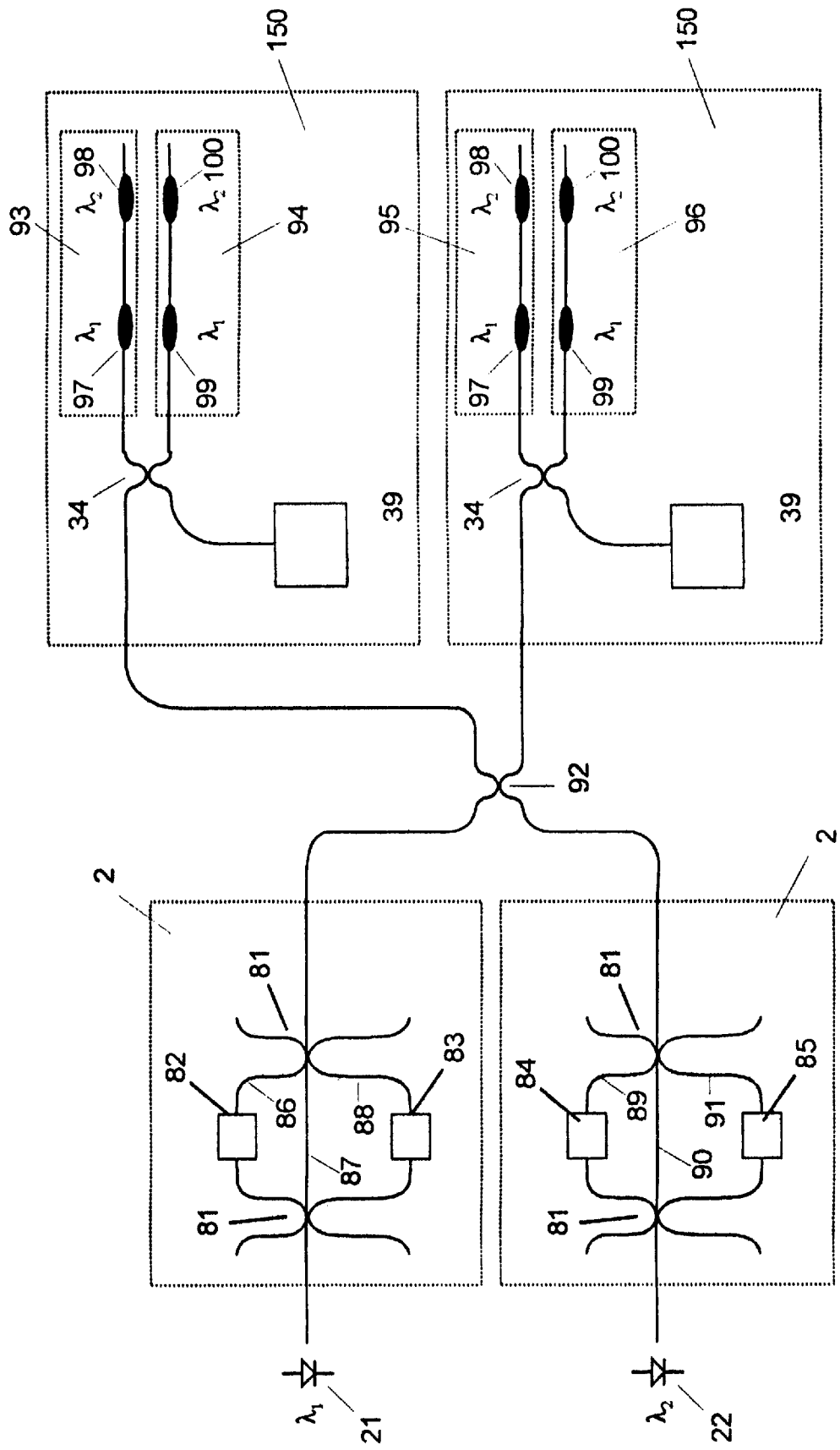
FIG. 8 shows an apparatus for sensing one or more parameters where the matched interferometer means contains 3×3 couplers.

FIG. 8 shows a preferred embodiment employing 3×3 couplers 81 in the matched interferometer means 2, frequency shifters 82–85 having different frequency shifts, optical fibres 86–91 where the optical fibres 86–88 or 89–91 in each matched interferometer have different lengths, and where the outputs from each matched interferometer is coupled to optical fibre hydrophone arrays 93 to 96 via an optical fibre coupler 92, and where the reflected signals from the optical fibre hydrophone arrays 93 to 96 is returned to two detector means 39 via optical fibre couplers 34. In this system, the hydrophone array 93 is identical to hydrophone array 95, and the hydrophone array 94 is identical to hydrophone array 96. The detector means 39, optical fibre coupler 92 and the hydrophone arrays 93 and 94 thus comprise a hydrophone subsystem 150. The hydrophone arrays 93 and 94 are separately identifiable because the optical path differences in the hydrophone elements 97 and 98 are different from the optical path differences in the hydrophone elements 99 and 100. The lengths of the optical fibres 86–91 are chosen such that the differences in the length of optical fibre 86 and optical fibre 87 matches the optical path length difference in hydrophone element 97, while the differences in the lengths of optical fibre 88 and optical fibre 87 matches the optical path difference in hydrophone element 99. The embodiment shown in FIG. 8 therefore doubles the numbers of hydrophones that can be interrogated in the equivalent embodiment shown in FIG. 2 (ie with 2 sources and 2 arrays). It should be noted that it would be possible to insert another array alongside arrays 93 and 94 with the lengths of its hydrophone elements matched to the difference in the lengths of the optical fibres 86 and 88, and 89 and 91 providing that the three path length differences in each matched interferometer are greater than the coherence length of the respective optical sources 21 and 22, and that the frequency difference between the two frequency shifters 82 and 83, and 84 and 85 are also unique frequencies.

The number of hydrophones that can be interrogated can be increased further using time division multiplexing techniques. For example, the hydrophone array 93 can be made longer with the hydrophone elements 97 and 98 being repeated periodically. It is then necessary to pulse the light entering into the hydrophone array 93 so that light from more than one set of hydrophone elements 97 and 98 does not reach the detector means 39 at any one time.

Figure 9:
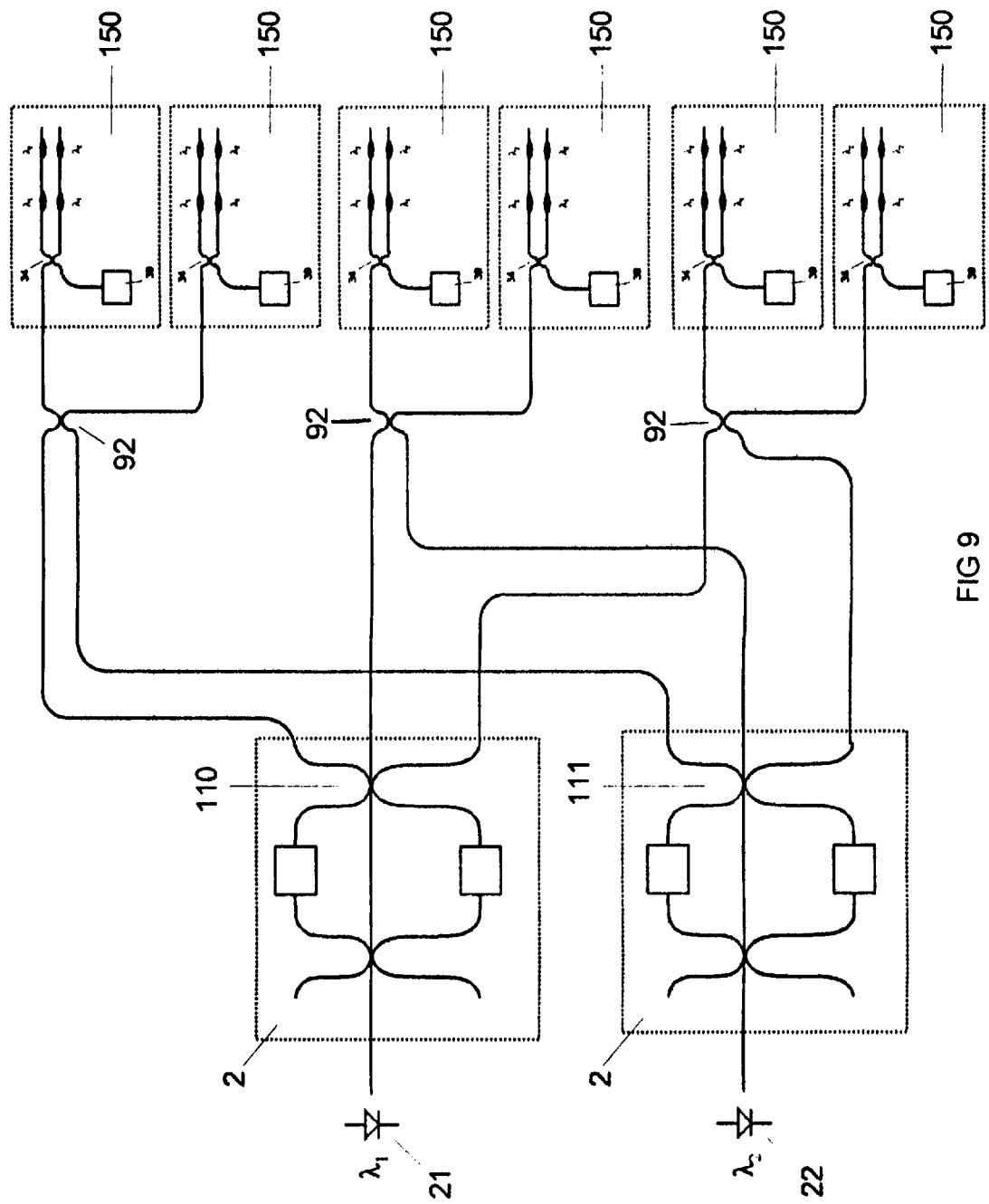
FIG. 9 shows an apparatus for sensing one or more parameters where efficient use is made of all the outputs from the matched interferometers.

FIG. 9 shows three times the numbers of hydrophone arrays 93 and 94 than are shown in FIG. 8 but using the same number of sources. This has been achieved by using all three outputs of the 3×3 couplers 110 and 111.

Figure 10:
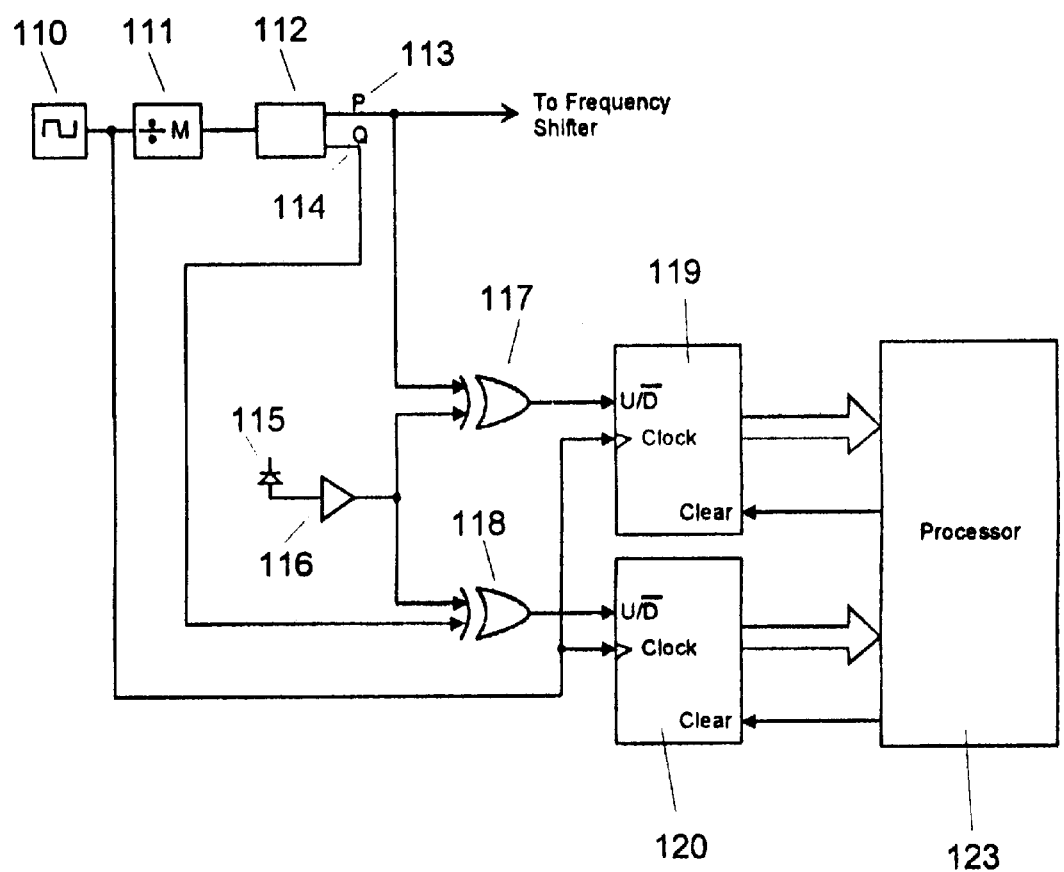
FIG. 10 shows a digital implementation of a detector means.

FIG. 10 shows an embodiment of the electronics within the detector means 5. A high frequency clock 110 is divided down by a counter network 111 whose output is used to generate two quadrature square-wave signals P 113 and Q 114. The square wave signal P 113 is used to drive a frequency shifter 25 in a matched interferometer means 2. The resulting signal from a hydrophone element 35 is converted to an electrical signal by a detector 115, amplified by an amplifier 116, and demodulated by two exclusive-OR gates 117 and 118 whose references are the quadrature square-wave signals P 113 and Q 114. The demodulated signals are then input to two up/down counters 119, 120 whose clock signal is taken from the high-frequency clock 110. The outputs of the up/down counters 119, 120 are read periodically by a processor 123 which converts the demodulated signals into a phase measurement. The processor is able to clear the up/down counters 119, 120 in order to initialise the system. The embodiment has the advantage that it is inherently digital and that there is therefore no requirement for high-precision analogue to digital converters. The embodiment is preferred when there is a requirement for a large number of hydrophones in the system, the maximum bandwidth is relatively low (<5 kHz), and power consumption of the electronics is an important. It will be appreciated that care has to be taken to correctly bias the signals in the system.

Figure 11:
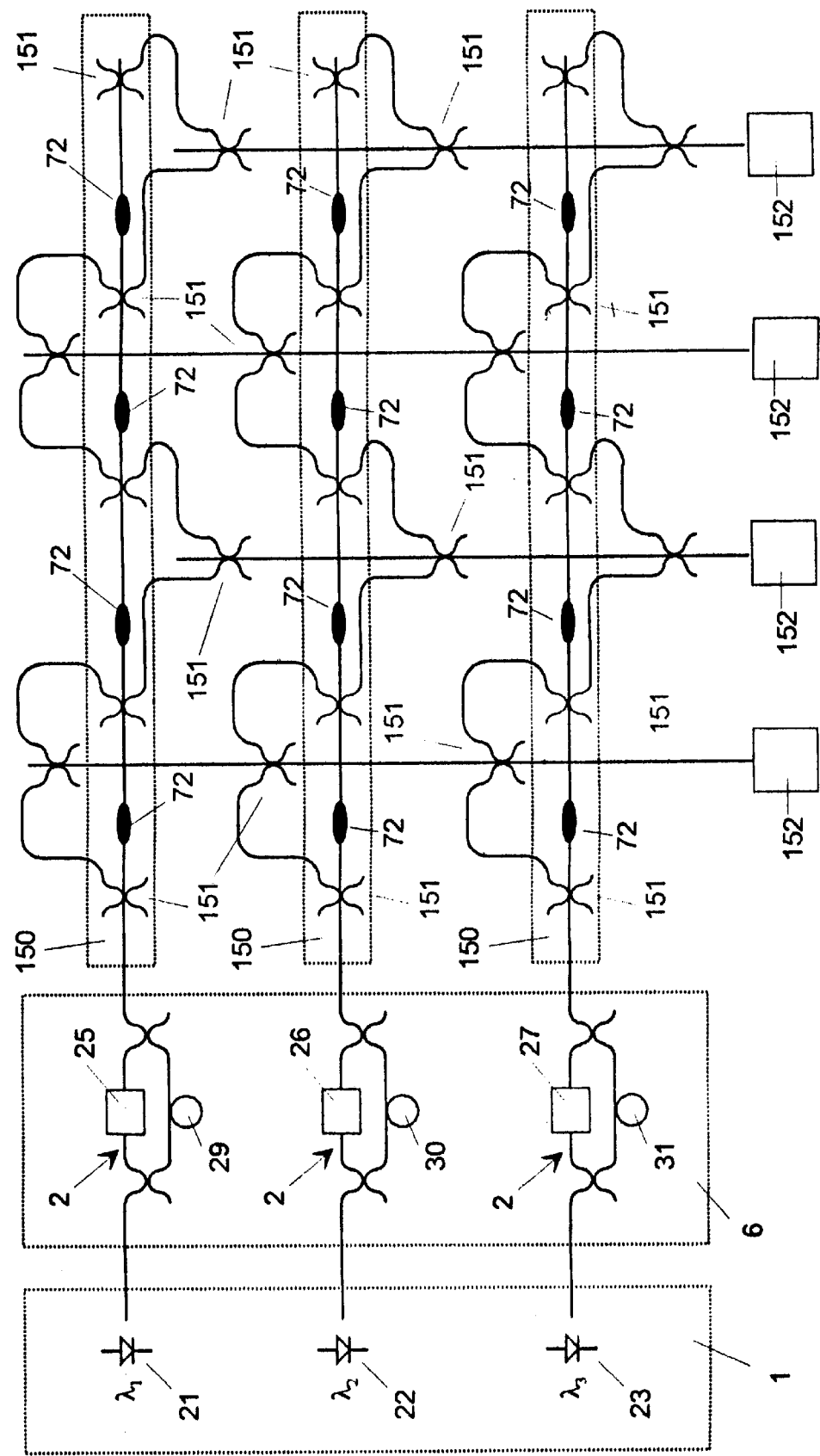
FIG. 11 shows an optical fibre hydrophone array with 3 by 3 couplers.

FIG. 11 shows an embodiment of the present invention comprising three optical sources 21, 22, 23 connected to three matched interferometer means 2 each containing a phase modulation means 25, 26, 27 with a unique identifying characteristic and where each matched interferometer means 2 is connected to an array 150, each containing four interferometric sensing elements 72, and where the outputs from the interferometric sensing elements 72 is routed by 3×3 couplers 151 to detector means 152 such that there is no more than one signal on each detector means 152 having the same unique identifying characteristic associated with one of the phase modulator means 25, 26 or 27. It should be noted in this embodiment that the power tapped from each interferometric sensing element 72 to the detector means 5 is preferably several percent in order to allow long arrays 150 of fibre-optic sensing elements 72 and that the proportion of power tapped would preferably increase along the array 150.

It is to be appreciated that the embodiments of the invention described above with reference to the accompanying drawings have been given by way of example only and that modification and additional components may be provided to enhance the performance of the apparatus.

We claim:

1. Apparatus for multiplexing fibre-optic sensing interferometers, which apparatus comprises at least one optical source, a plurality of matched interferometer means connected to the optical source and each containing a phase modulator having a unique identifying characteristic, a network of fibre-optic sensing interferometers each containing a path-length difference, at least one detector, and interconnection means provided between the matched interferometer means, the network of fibre-optic sensing interferometers and the detector, the path length difference in each fibre-optic sensing interferometer being approximately matched to a path length difference in its associated matched interferometer means, and the interconnection means between the matched interferometer means, the network of fibre-optic sensing interferometers and the detector being such that there is no more than one signal on the detector having the same unique identifying characteristic associated with one of the phase modulators.

2. Apparatus according to claim 1 in which at least one of the phase modulators is a frequency shifter whose unique identifying characteristic is the magnitude of the frequency shift.

3. Apparatus according to claim 1 in which at least one of the said fibre-optical sensing interferometers is formed in a length of the optical fibre having two ends, and in which each said end is provided with an optical fibre Bragg grating.

4. Apparatus according to claim 3 in which the optical fibre Bragg gratings in at least one of the said fibre-optic sensing interferometers are chirped in opposite directions.

5. Apparatus according to claim 1 in which the fibre-optic sensing interferometers are optical fibre hydrophones.

6. Apparatus according to claim 5 in which the optical fibre-hydrophones are constructed from an optical fibre twisted around a compliant member and bonded.

7. Apparatus according to claim 1 in which there is a plurality of the optical sources, in which the optical sources have centre wavelengths, in which each said optical source is connected to a said matched interferometer means, in which each said matched interferometer means contains a frequency shifter with a unique frequency, in which each said matched interferometer means is connected to first coupler means which couples power from said matched interferometer means to arrays of the fibre-optic sensing interferometers, in which each fibre optic sensing interferometer comprises an input optical fibre Bragg grating and an output optical fibre Bragg grating, in which no two of the fibre-optic sensing interferometers in each array of the fibre-optic sensing interferometers have the same centre reflective wavelength, in which the path length difference in each fibre-optic sensing interferometer is approximately equal to the path length difference in its associated matched interferometer means, in which there is a plurality of the detectors, and in which there is a plurality of the second coupler means for directing the reflected power from each array of the fibre optic sensing interferometers each to a separate one of the detectors.

8. Apparatus according to claim 1 in which each said detector is connected to a low-noise amplifier, and in which there is an array of demodulators each comprising a tuned filter tuned to a unique frequency, whose output is connected to two phase-modulation demodulators whose references are signals at the said unique frequency, but whose phases are in quadrature, and in which the outputs from the phase-modulation demodulators are processed in processing to give an instantaneous output signal comprising integral and fractional fringe positions.

9. Apparatus according to claim 1 in which there is a plurality of the optical sources connected to the plurality of the matched interferometer means, in which each said matched interferometer means is connected to a separate array of the fibre-optic sensing interferometers, in which each said array of fibre-optic sensing interferometers each contains a plurality of interferometric sensing interferometers, and in which outputs from the fibre-optic sensing interferometers are routed by the interconnection means to a plurality of the detectors such that there is no more than one signal on each detector having the same unique identifying characteristic associated with one of the phase modulators.

10. Apparatus according to claim 1 in which the optical source is a broad band optical source, and in which the path length differences in each of the matched interferometer means are different from each other.

11. Apparatus for multiplexing fibre-optic sensing interferometers, which apparatus comprises at least one optical source, a plurality of matched interferometer means connected to the optical source and each containing a phase modulator having a unique identifying characteristic, a network of fibre-optic sensing interferometers each containing a path-length difference, at least one detector, and interconnection means provided between the matched interferometer means, the network of fibre-optic sensing interferometers and the detector, the path length difference in each fibre-optic sensing interferometer being approximately matched to a path length difference in its associated matched interferometer means, and the interconnection means between the matched interferometer means, the network of fibre-optic sensing interferometers and the detector being such that there is no more than one signal on the detector having the same unique identifying characteristic associated with one of the phase modulators, and the apparatus being one in which there is a plurality of the optical sources, in which the optical sources have centre wavelengths, in which each said optical source is connected to a said matched interferometer means, in which each said matched interferometer means contains a frequency shifter with a unique frequency, in which each said matched interferometer means is connected to first coupler means which couples power from said matched interferometer means to arrays of the fibre-optic sensing interferometers, in which each fibre optic sensing interferometer comprises an input optical fibre Bragg grating and an output optical fibre Bragg grating, in which no two of the fibre-optic sensing interferometers in each array of the fibre-optic sensing interferometers have the same centre reflective wavelength, in which the path length difference in each fibre-optic sensing interferometer is approximately equal to the path length difference in its associated matched interferometer means, in which there is a plurality of the detectors, and in which there is a plurality of the second coupler means for directing the reflected power from each array of the fibre optic sensing interferometers each to a separate one of the detectors.

12. Apparatus according to claim 11 in which at least one of the phase modulators is a frequency shifter whose unique identifying characteristic is the magnitude of the frequency shift.

13. Apparatus according to claim 11 in which at least one of the said fibre-optic sensing interferometers is formed in a length of the optic fibre having two ends, and in which each said end is provided with an optical fibre Bragg grating.

14. Apparatus according to claim 13 in which the optical fibre Bragg gratings in at least one of the said fibre-optic sensing interferometers are chirped in opposite directions.

15. Apparatus-according-to claim 11 in which the fibre-optic sensing interferometers are optical fibre hydrophones.

16. Apparatus according to claim 15 in which the optical fibre hydrophones are constructed from an optical fibre twisted around a compliant member and bonded.

17. Apparatus according to claim 11 in which the optical source is a broad band optical source, and in which the path length differences in each of the matched interferometer means are different from each other.

* * * * *